US011403926B2

(12) United States Patent
Siner, Jr.

(10) Patent No.: US 11,403,926 B2
(45) Date of Patent: Aug. 2, 2022

(54) INTERACTIVE SECURITY SYSTEM FOR A STATIONARY STORAGE CONTAINER

(71) Applicant: Eli Siner, Jr., Rosharon, TX (US)

(72) Inventor: Eli Siner, Jr., Rosharon, TX (US)

( * ) Notice: Subject to any disclaimer, the term of this patent is extended or adjusted under 35 U.S.C. 154(b) by 0 days.

(21) Appl. No.: 15/926,471

(22) Filed: Mar. 20, 2018

(65) Prior Publication Data

US 2022/0051535 A1      Feb. 17, 2022

(51) Int. Cl.
*G08B 13/196*      (2006.01)
*H04W 76/10*       (2018.01)
*G06F 3/02*        (2006.01)

(52) U.S. Cl.
CPC . *G08B 13/19682* (2013.01); *G08B 13/19684* (2013.01); *H04W 76/10* (2018.02); *G06F 3/0202* (2013.01)

(58) Field of Classification Search
CPC ....... G08B 13/19682; G08B 13/19684; H04W 76/10; G06F 3/0202
See application file for complete search history.

(56) References Cited

U.S. PATENT DOCUMENTS

| | | | | |
|---|---|---|---|---|
| 6,895,873 B1* | 5/2005 | Searle | ...................... | E05G 1/005 109/25 |
| 7,332,728 B2* | 2/2008 | Beinhocker | ................ | G01J 1/04 250/474.1 |
| 9,842,449 B1* | 12/2017 | Ruth | ....................... | B65D 55/02 |
| 10,097,353 B1* | 10/2018 | Carlson | ................. | H04W 4/021 |
| 2006/0220842 A1* | 10/2006 | Breed | ..................... | G06Q 10/06 340/539.13 |
| 2010/0033329 A1* | 2/2010 | Davis | .................. | G08B 13/1436 340/571 |
| 2011/0133933 A1* | 6/2011 | Davis | .................. | G08B 13/1436 340/571 |
| 2012/0313783 A1* | 12/2012 | Yang | ................... | G08B 13/1436 340/568.1 |
| 2013/0014549 A1* | 1/2013 | Cavanaugh | ............. | E05B 37/00 70/63 |
| 2014/0196636 A1* | 7/2014 | Deweese | ................... | E05G 1/00 109/23 |
| 2015/0302728 A1* | 10/2015 | Gettings | ................... | G08B 3/10 340/506 |
| 2015/0320209 A1* | 11/2015 | Hasselback | ........... | H04N 5/2252 348/151 |
| 2017/0083164 A1* | 3/2017 | Sheng | .................. | G06F 3/03545 |
| 2017/0176123 A1* | 6/2017 | Milde, Jr. | ............... | F41A 17/08 |
| 2017/0278368 A1* | 9/2017 | Burke | ............. | G08B 13/19669 |
| 2018/0047262 A1* | 2/2018 | Syrjalahti | ............... | G01F 23/00 |

(Continued)

*Primary Examiner* — Jared Walker
(74) *Attorney, Agent, or Firm* — Christopher Mayle; Bold IP, PLLC

(57) ABSTRACT

An interactive security system for placement on a stationary storage container that includes: an attachable object, adapted to attach to the stationary storage container where sensors are within the object capable of detection of movement of the attachable object. The security system also includes an attachable gyroscope, adapted to attach to the stationary storage container and provides a means to detect movement. An attachable keyboard is also provided, wherein the keyboard provides a control device for the interactive security system. Further, an attachable camera is included in the security system, where the attachable camera records activity near the stationary storage container.

8 Claims, 8 Drawing Sheets

(56) References Cited

U.S. PATENT DOCUMENTS

| | | | | |
|---|---|---|---|---|
| 2018/0137494 A1* | 5/2018 | Matsukura | ............. | G06Q 30/04 |
| 2018/0186531 A1* | 7/2018 | McBride | ............. | E05B 65/0075 |
| 2019/0025898 A1* | 1/2019 | Chennakeshu | ....... | G06F 1/3296 |
| 2020/0397172 A1* | 12/2020 | Kennett | ................. | E05B 65/52 |

* cited by examiner

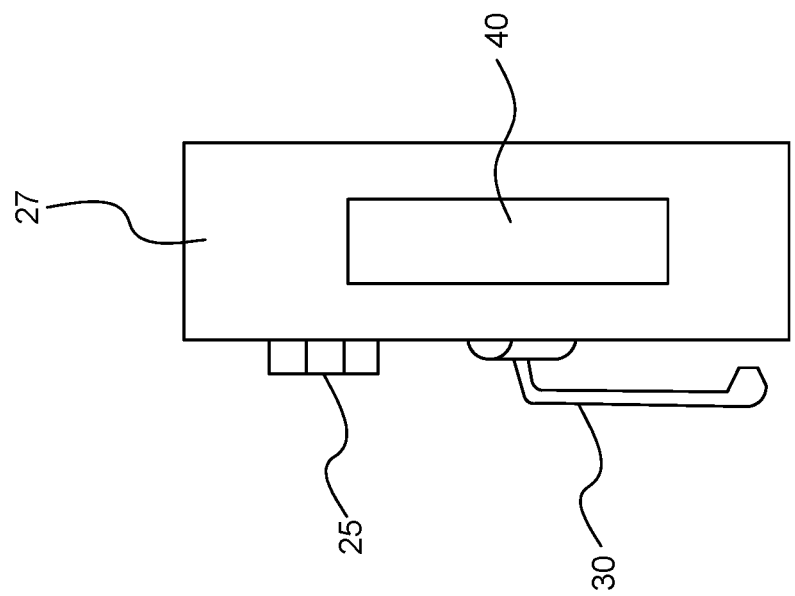

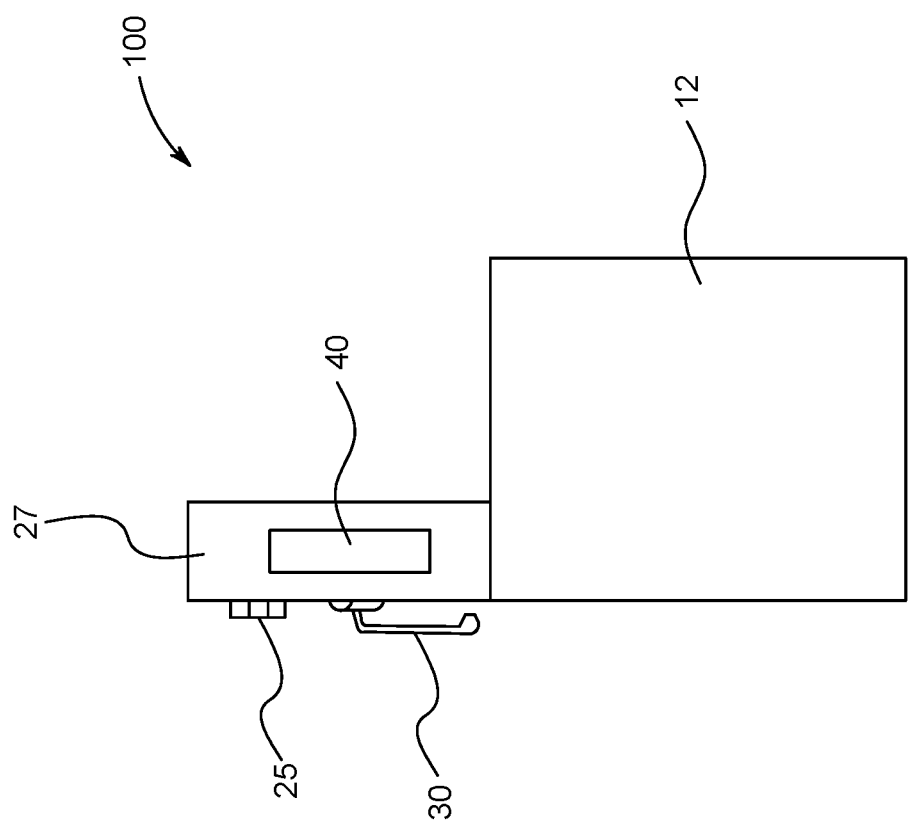

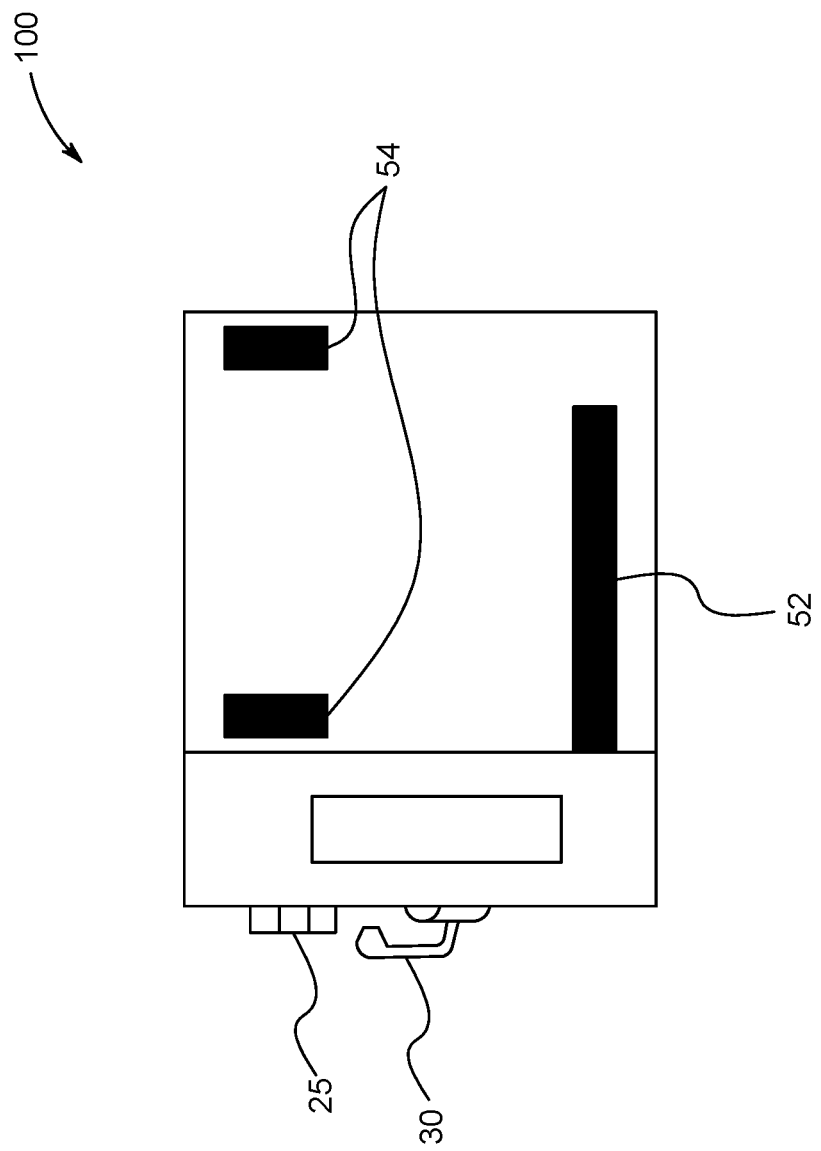

INTERACTIVE SECURITY SYSTEM FOR A STATIONARY STORAGE CONTAINER

BACKGROUND OF THE INVENTION

Field of Invention

The present invention relates to an interactive security system that is attached to a stationary storage container such as a safe or filing cabinet, etc.

Description of Related Art

It is important that individuals secure certain items in a safe storage system for safekeeping. Individuals must normally place important documents and firearms into a secure cabinet or safe to ensure that the items are kept very secure and away from unauthorized users and further to prevent any accidental gun accidents. Normally people lock items within a safe that may include a combination lock and/or alarm system. Occasionally systems are integrated with existing alarm systems and therefore provide alerts for the user. The importance of these alarm and alerting systems are quite magnified in certain instances and it is very important that the alarm to be prompt to provide prompt alerts to an end user, It is also advantageous that such alarm systems include alerts that could be transmitted to a portable electronic device such as a Smart Phone.

As a result, this it is the object of the present invention to provide an integrated interactive security system that may be implemented and placed upon an existing safe or filing cabinet, which is integrated within a Smart Phone. Such a system has been described in the U.S. Pat. No. 8,893,420 which is described as a trigger lock. The trigger locking system of this patent includes a specific input or authorized input identifier such as a code, fingerprint, facial image or otherwise or also provides entry with audio signals.

The object of the present invention is to provide an interactive alert system that may be installed upon an existing safe or storage cabinet or security system.

SUMMARY OF THE INVENTION

The present invention relates to an interactive security system for placement on a stationary storage container that includes: an attachable object, adapted to attach to the stationary storage container where sensors are within the object capable of detection of movement of the attachable object. The security system also includes an attachable gyroscope, adapted to attach to the stationary storage container and provides a means to detect movement. An attachable keyboard is also provided, wherein the keyboard provides a control device for the interactive security system. Further, an attachable camera is included in the security system, where the attachable camera records activity near the stationary storage container.

Preferably, the stationary storage container may include at least one of a safe, filing cabinet, money draw, cash register or gun cabinet. A wireless connection to a network is enabled, where alarm alerts generated by the interactive security system are transmitted to a user via the network. Software installed on a user's portable electronic device enables communications between the interactive security system and the user's portable electronic device.

BRIEF DESCRIPTION OF DRAWINGS

FIG. 1A shows a top view of a safe door according to the present invention.

FIG. 1B shows a top view of a safe with the safe door open.

FIG. 1D shows an interior view of the safe with contacts shown.

DETAILED DESCRIPTION

The present invention relates to an interactive security system that is attached to an existing file cabinet. The system includes an attachable object that includes sensors that detect movement of the attachable object. The sensors detects if a door or access point for a storage container has been jarred or opened. Further features of the security system include an electronic gyroscope that detects movement of the safe or file cabinet and an attachable camera that records activity near the object. These three items provide essentially three alarm alerts. First, the detection of any intruder near the safe or file cabinet through the use of the camera; an alert based upon movement based upon the gyroscope; and an alert for any breach of the door or drawers of the safe or cabinet. These alerts are transmitted to a user via a portable electronic device through a network connection. The network connection can be in the form of a cellular communications network, Bluetooth connection or wireless Internet connection. The system also works in conjunction with home security systems and Z-wave. Alerts may be set to send to the owner and/or safe provider with up to two users. Where the cabinet is used for gun storage a; trigger guard feature may be included on the guns. The proximity camera may be activated on motion of the gun in the safe such as a tracking device on each gun or triggers on proximity protocol sensing motion near the cabinet.

With respect to FIG. 1A a top view of a safe door 27 is depicted. Visible from the top view is a sensor 40 handle 30. Further a key pad is also depicted. FIG. 1B depicts a system 100 according to the present invention. The system 100 shows the safe door 27 with sensor 40 at the top of the safe door 27. Safe 12 is shown with the door 27 in an open position. Sensor 40 activates upon opening of this safe door to alert the users that entry into the safe has taken place.

Figure 1C:
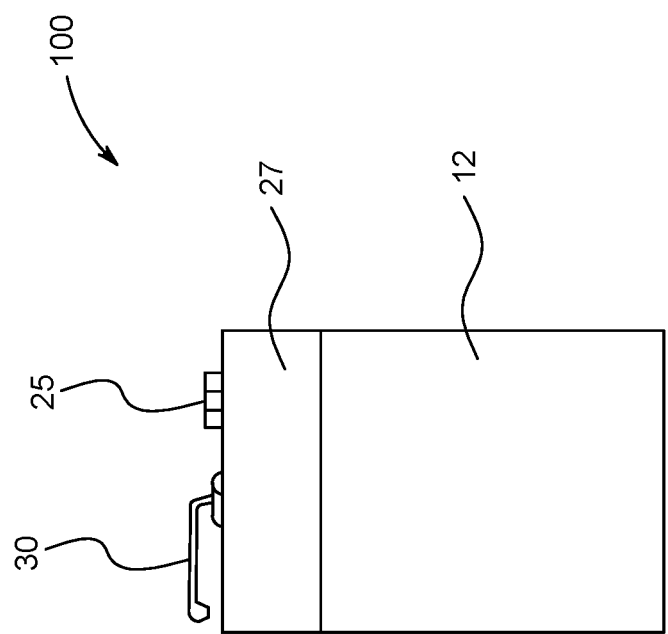
FIG. 1C shows the top of the safe with the door closed.

FIG. 1C shows door 27 in a closed position where the sensor 40 is not visible and is within the interior of safe 12. FIG. 1D depicts an interior view of the safe 12 with contacts 52 and 54 shown. These contacts provide notice of any entry into the interior of the safe 12.

Figure 2:
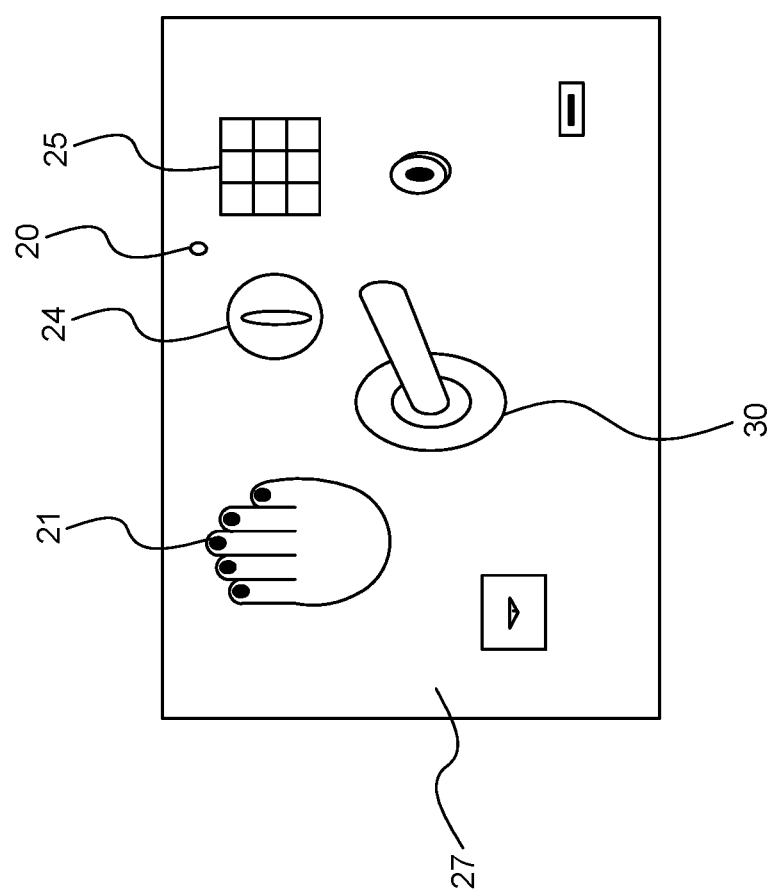
FIG. 2 shows a front view of the safe door according to the present invention.

FIG. 2 is a front view of safe door 27. The safe door 27 also includes handle 30 with a biometric pad 21 shown above handle 30. Other features of the safe door include camera 21 to record activity in front of the safe, a turn lock on 24 that provides an additional locking means and a keypad 25 providing an additional security means for entry into the safe.

Figure 3A:
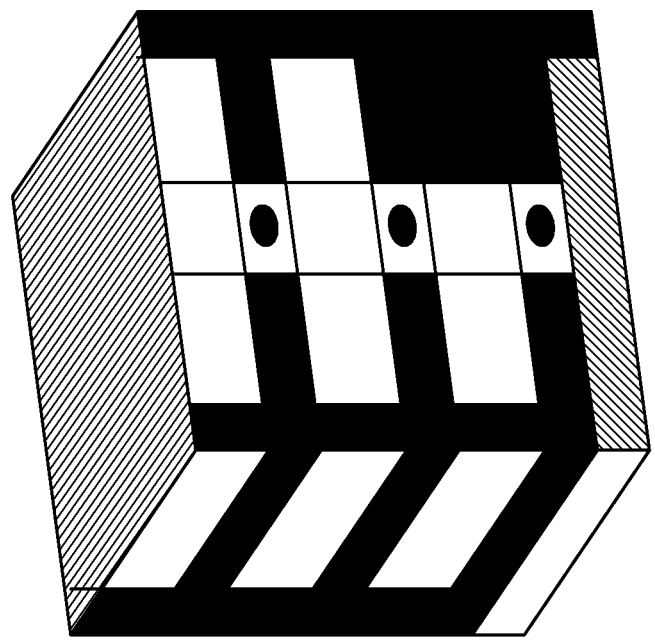
FIG. 3A depicts a contact grid according to the present invention.
Figure 3B:
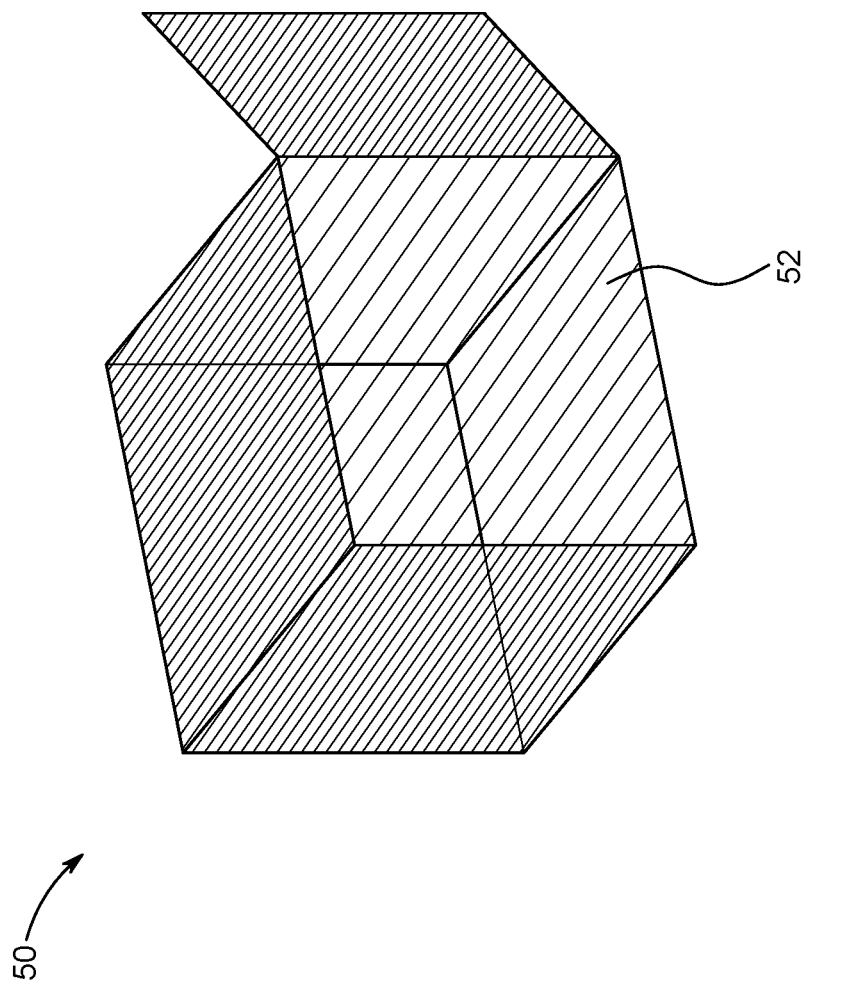
FIG. 3B depicts a contact according to the present invention.
Figure 4:
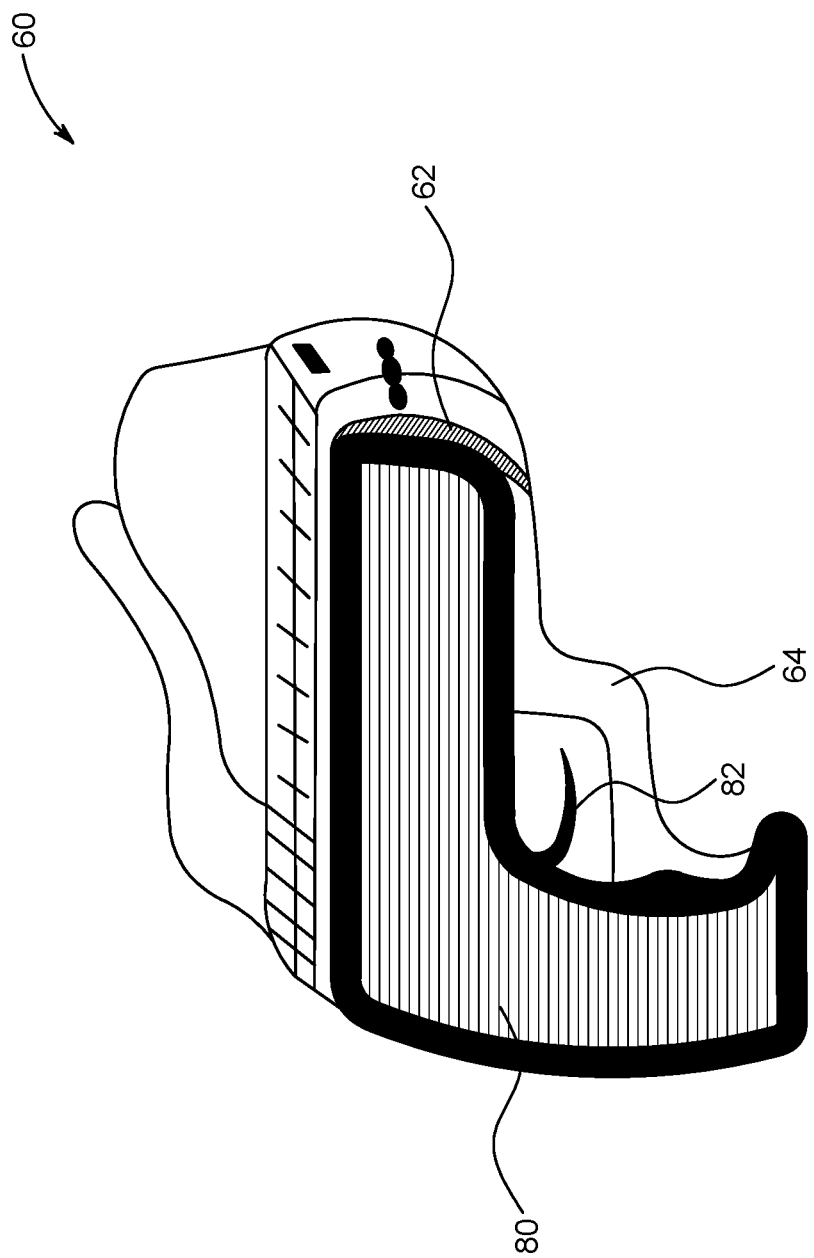
FIG. 4 depicts a gun holster according to present invention.

FIG. 3A shows a contact grid as available insertion into the interior of safe 12. Contact grid is also shown in FIG. 3B showing a bottom contact 52. Another feature of the present invention includes the gun holster 60 shown on FIG. 4. The gun holster receives the gun 80 with an additional sensor 62 provided in the gun holster as an alert system for removal of the gun from the gun holster. A trigger guard 64 is also provided as additional cover for trigger 82.

The security system of the present invention may be implemented with an existing home security system via Z-wave, internet or Bluetooth connections. Preferably up to two users may receive alerts such as the owner or safe provider. Up to two users; add trigger guard feature; two ways for proximity camera activated on motion gun in the safe tracking device on gun or other object and triggers on proximity protocol. Gun holster in a car.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The exemplary embodiment was chosen and described in order to best explain the principles of the invention and its practical application, to thereby enable others skilled in the art to best utilize the invention and various embodiments with various modifications as are suited to the particular use contemplated.

What is claimed is:

1. An interactive security system for placement on a stationary storage container comprising:
    an attachable object, adapted to attach to the stationary storage container;
    one or more holsters;
    one or more sensors within the attachable object capable of detection of movement of the attachable object, wherein the one or more sensors determine if a gun has been removed from the one or more holsters;
    an attachable gyroscope, adapted to attach to the stationary storage container and provides a means to detect the movement;
    an attachable keyboard, wherein the attachable keyboard provides a control device for the interactive security system;
    an attachable proximity camera, wherein the attachable proximity camera records activity near the stationary storage container; and
    software on a user's electronic device, wherein the software enables communications between the interactive security system and the user's electronic device, wherein alarm alerts include a first alert that an intruder is near the stationary storage container, a second alert that there was a breach of a door and one or more drawers of the stationary storage container, and a third alert that there was any movement of the stationary storage container in response to the attachable gyroscope.

2. The interactive security system according to claim 1, where the stationary storage container includes at least one of a safe, filing cabinet, money draw, cash register or gun cabinet.

3. The interactive security system according to claim 2, further including a wireless connection to a network.

4. The interactive security system according to claim 3, wherein the alarm alerts generated by the interactive security system are transmitted to a user via the network.

5. The interactive security system according to claim 1 further comprising a contact grid.

6. A method for an interactive security system for placement on a stationary storage container, the method comprising:
    attaching an object to the stationary storage container, wherein the stationary storage container is a safe; the object having one or more drawers, the object having one or more sensors within the object capable of detection of movement of the object, an attachable gyroscope, adapted to attach to the stationary storage container and provides a means to detect movement, a keyboard, wherein the keyboard provides a control device for the interactive security system; and an attachable proximity camera, wherein the attachable proximity camera records activity near the stationary storage container,
    positioning one or more holsters with a sensor of the one or more sensors that determines if a gun has been removed from the one or more holsters; and
    notifying by an alert for an intruder near the stationary storage container, notifying by a second alert for a breach of a door and the one or more drawers of the stationary storage container, notifying by a third alert any movement of the stationary storage container in response to the attachable gyroscope.

7. The method of claim 6 further comprising:
    notifying the alert, the second alert, and the third alert on a mobile computing device.

8. The method of claim 7 further comprising:
    notifying the alert, the second alert, and the third alert on a second mobile computing device.

* * * * *